US012688133B2

(12) United States Patent
Lambert et al.

(10) Patent No.: US 12,688,133 B2
(45) Date of Patent: Jul. 21, 2026

(54) DUAL-PHASE INTERFACES ON A SHARED BUS

(71) Applicant: Dell Products L.P., Round Rock, TX (US)

(72) Inventors: Timothy M. Lambert, Austin, TX (US); George Harris, Cambridge, MA (US); Jeffrey Kennedy, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/649,727

(22) Filed: Apr. 29, 2024

(65) Prior Publication Data

US 2025/0335377 A1 Oct. 30, 2025

(51) Int. Cl.
*G06F 13/20* (2006.01)

(52) U.S. Cl.
CPC .......... *G06F 13/20* (2013.01); *G06F 2213/40* (2013.01)

(58) Field of Classification Search
None
See application file for complete search history.

(56) References Cited

U.S. PATENT DOCUMENTS

| | | | | |
|---|---|---|---|---|
| 6,886,057 B2 * | 4/2005 | Brewer | ................ | G06F 13/385 |
| | | | | 710/63 |
| 8,036,243 B2 * | 10/2011 | Georgiou | ............. | H04L 49/602 |
| | | | | 370/467 |
| 9,146,823 B2 * | 9/2015 | Mondal | ................ | G06F 11/221 |
| 9,767,067 B2 * | 9/2017 | Rao | ....................... | G06F 15/161 |
| 2016/0259568 A1 * | 9/2016 | Grimsrud | ............. | G06F 3/0661 |
| 2022/0014416 A1 * | 1/2022 | Li | ....................... | H04L 41/0273 |
| 2022/0414045 A1 * | 12/2022 | Yang | ................... | G06F 13/4282 |
| 2024/0061964 A1 * | 2/2024 | Faasse | ................... | G06F 21/85 |

* cited by examiner

*Primary Examiner* — Elias Mamo
(74) *Attorney, Agent, or Firm* — Jackson Walker L.L.P.

(57) ABSTRACT

An information handling system may include at least one processor; an interface configured to communicatively couple the processor to an information handling resource via a first communications protocol; and an interface controller configured to manage the interface. The interface controller may be configured to: transmit a payload to the information handling resource via the interface, wherein the payload is transmitted via a second communications protocol different from the first communications protocol, and wherein the payload includes information usable to establish communications via the first communications protocol; and in response to the payload being received by the information handling resource, establish communications via the first communications protocol with the information handling resource.

18 Claims, 3 Drawing Sheets

DUAL-PHASE INTERFACES ON A SHARED BUS

TECHNICAL FIELD

The present disclosure relates in general to information handling systems, and more particularly to the use of multiple interfaces over a shared bus.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The Open Compute Project (OCP) is an organization that provides (among other things) various standardized interface types between components of an information handling system. The Datacenter Secure Control Module (DC-SCM) Specification is one such standard that is broadly applicable to a wide variety of platform types.

It is to be noted that various terms discussed herein are described in the Open Compute Project Datacenter Secure Control Module Specification Version 1.0, released Mar. 11, 2021 (hereinafter, DC-SCM Specification), which is hereby incorporated by reference in its entirety. One of ordinary skill in the art with the benefit of this disclosure will understand its applicability to other specifications (e.g., prior or successor versions of the DC-SCM Specification). Further, some embodiments may be applicable to different technologies other than those described in the DC-SCM Specification.

One of the interfaces defined by the DC-SCM Specification is Serial General Purpose I/O (SGPIO). SGPIO may be used between any two information handling resources. For example, it may couple an information handling system to a component thereof, or two a separate information handling system or some component thereof. In one embodiment, it may couple a SCM and a host processor module (HPM). In general, the proper operation of SGPIO may require a priori knowledge of the Data In and Data Out signal content on each end of the bus. Since that content is not standardized, it is difficult or impossible to adapt dynamically to a new SGPIO partner. For example, the SCM SGPIO data content from one vendor may not match the HPM SGPIO data content from another vendor, etc.

This disclosure provides techniques for combining universal asynchronous receiver/transmitter (UART) and SGPIO buses into a single group of pins with a two-phase negotiation for discovery before use. Embodiments allow for negotiation and dynamic mode switching. While SGPIO requires static data content definitions to be pre-negotiated at both ends of the bus, the UART mode of the present disclosure may be utilized to negotiate capabilities, speeds, and data bit structures prior to transitioning to from UART mode to SGPIO mode.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with initializing an interface on a communications bus may be reduced or eliminated.

In accordance with embodiments of the present disclosure, an information handling system may include at least one processor; an interface configured to communicatively couple the processor to an information handling resource via a first communications protocol; and an interface controller configured to manage the interface. The interface controller may be configured to: transmit a payload to the information handling resource via the interface, wherein the payload is transmitted via a second communications protocol different from the first communications protocol, and wherein the payload includes information usable to establish communications via the first communications protocol; and in response to the payload being received by the information handling resource, establish communications via the first communications protocol with the information handling resource.

In accordance with these and other embodiments of the present disclosure, a method may include an interface controller of an interface that is configured to communicatively couple to an information handling resource via a first communications protocol transmitting a payload from an information handling system to the information handling resource via a second communications protocol different from the first communications protocol, wherein the payload includes information usable to establish communications via the first communications protocol; and in response to the payload being received by the information handling resource, the interface controller establishing communications via the first communications protocol with the information handling resource.

In accordance with these and other embodiments of the present disclosure, an article of manufacture may include a non-transitory, computer-readable medium having computer-executable instructions thereon that are executable by a processor of an interface controller of an interface that is configured to communicatively couple to an information handling resource via a first communications protocol for: transmitting a payload from an information handling system to the information handling resource via a second communications protocol different from the first communications protocol, wherein the payload includes information usable to establish communications via the first communications protocol; and in response to the payload being received by the information handling resource, the interface controller establishing communications via the first communications protocol with the information handling resource.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
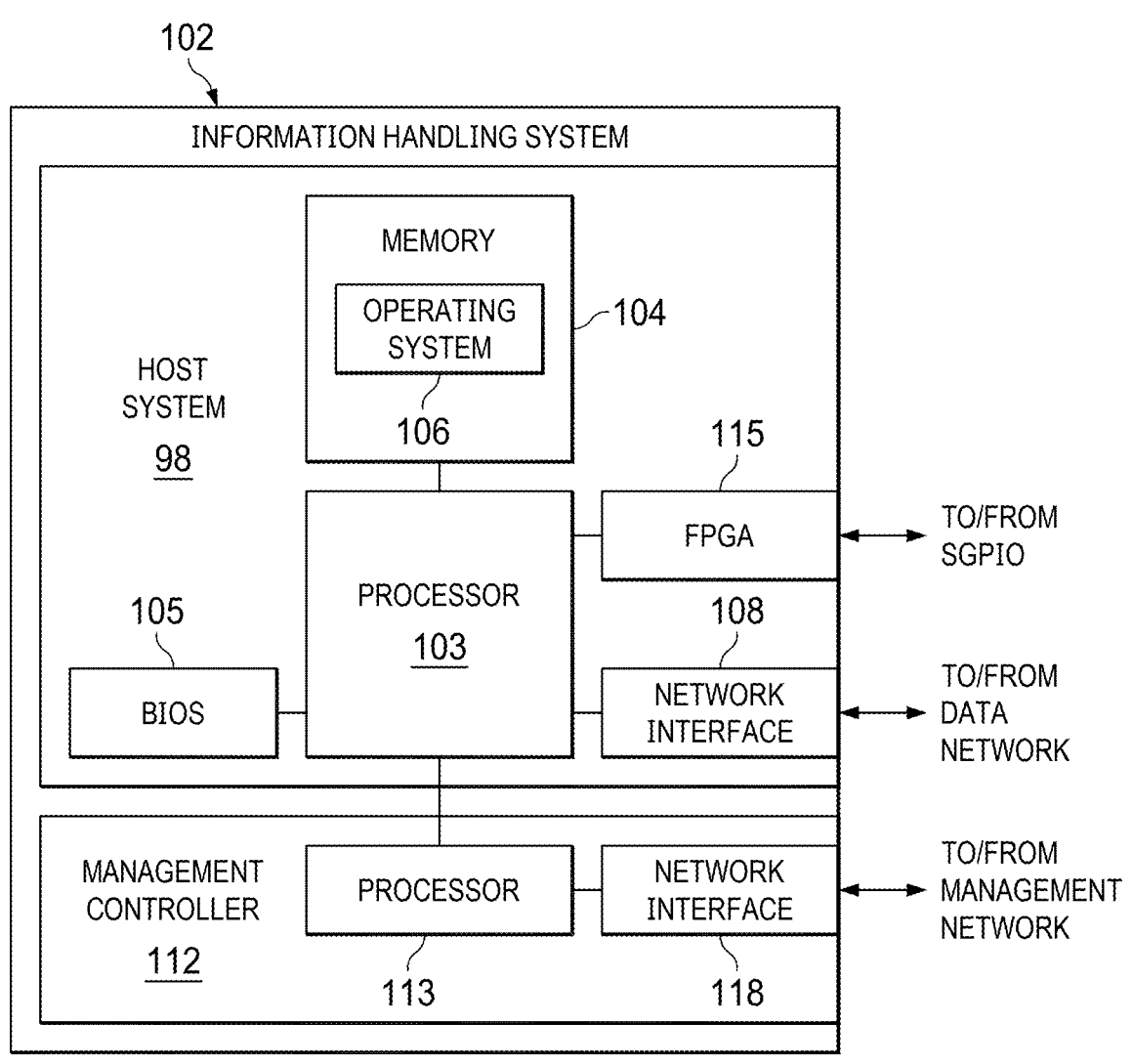
FIG. 1 illustrates a block diagram of an example information handling system, in accordance with embodiments of the present disclosure.
Figure 2:
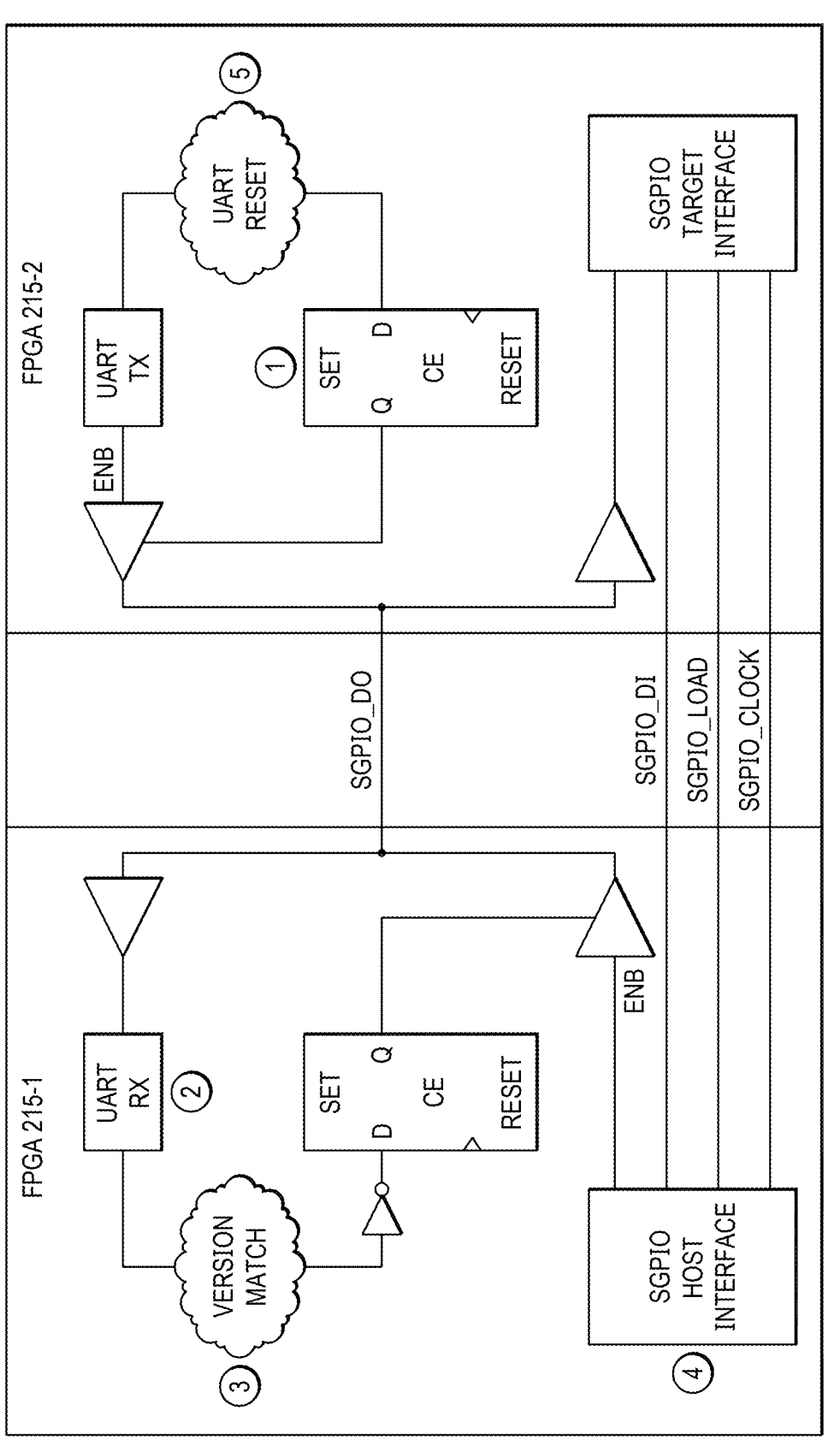
FIG. 2 illustrates communicatively coupling via UART and GPIO without an explicit acknowledgment signal, in accordance with embodiments of the present disclosure.
Figure 3:
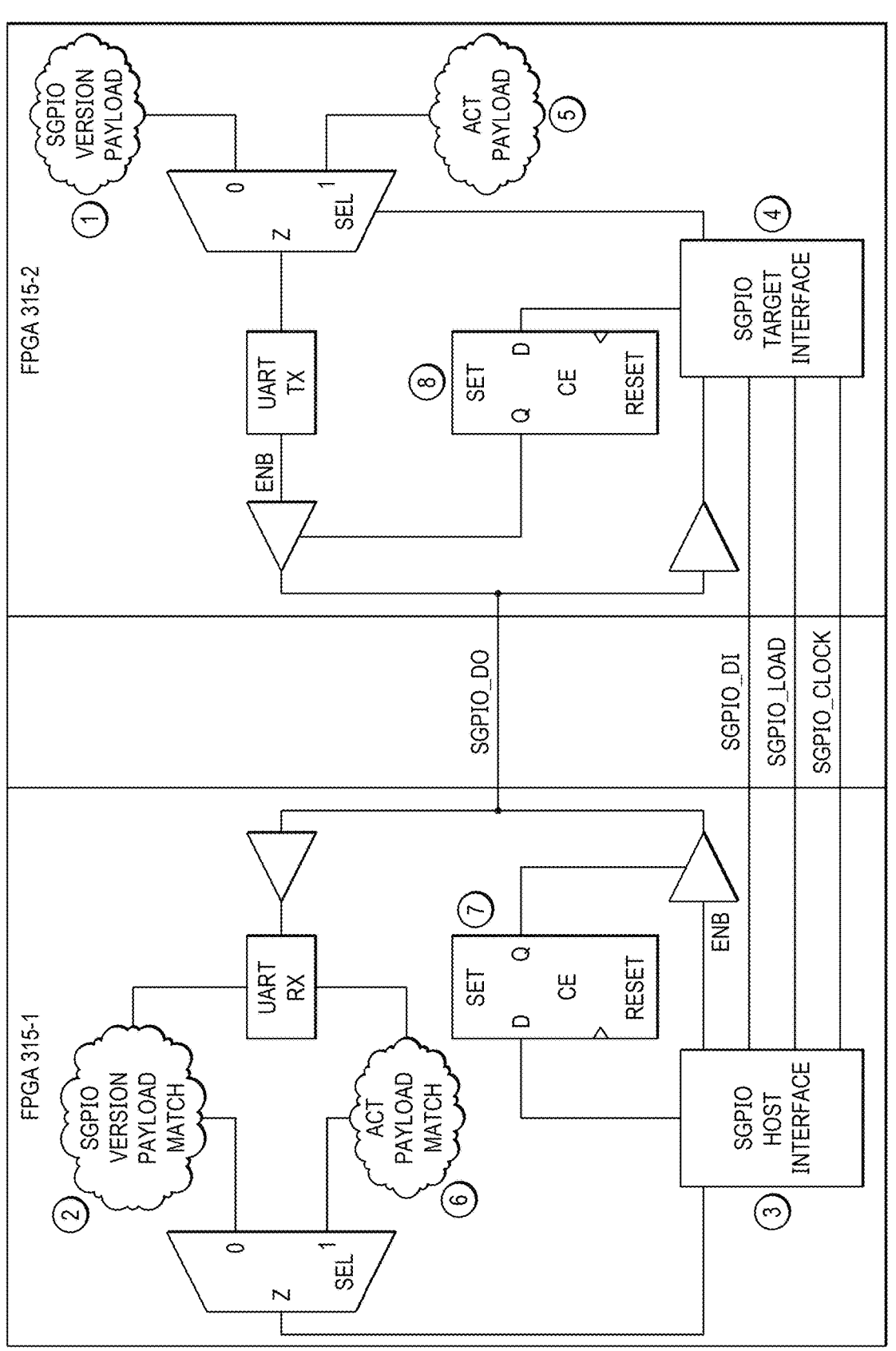
FIG. 3 illustrates communicatively coupling via UART and GPIO with an explicit acknowledgment signal, in accordance with embodiments of the present disclosure.

Preferred embodiments and their advantages are best understood by reference to FIGS. 1 through 3, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

Information handling system 102 may also include an interface such as an SGPIO interface, which may be used to communicatively couple to other components and/or other information handling systems. In some embodiments, the SGPIO interface may be coupled to processor 103 of the host system as shown, while in other embodiments it may be coupled to processor 113 of management controller 112.

As shown, a component such as a field programmable gate array (FPGA) 115 may be used in communicating via such an interface. The example of an FPGA is discussed in detail in this disclosure for the sake of concreteness, but in other embodiments, a different component may carry out the functionality described herein. For example, a complex programmable logic device (CPLD), a microcontroller, a microprocessor, or in general any circuitry capable of performing as described herein may be used.

As discussed above, embodiments of this disclosure may be used to address certain problems that may arise when initiating communication via interfaces that require certain parameters to be pre-negotiated at both ends of the bus (SGPIO is an example described in the most detail herein). Embodiments may achieve this by leveraging the existing SGPIO signal lines and using them initially for a simpler communication scheme (e.g., UART), which may be used to negotiate parameters and bring up the SGPIO interface. The SGPIO interface may remain inactive until after a valid UART exchange has been completed. Since the SGPIO interface includes some vendor-specific dependencies, the use of such a UART exchange provides a means to announce what is connected on each end of the bus. This may prevent problems where a reset or power controls are not aligned, as well as in other situations.

FIG. 2 illustrates an embodiment in which SGPIO communication is established between two systems having components such as FPGA 115 from FIG. 1, denoted FPGA 215-1 and FPGA 215-2. In this example, FPGA 215-1 is the initiator for communications, and FPGA 215-2 is the target. The four signal lines shown are the standard SGPIO lines: DataOut (SGPIO_DO), DataIn (SGPIO_DI), Load (SGPIO_LOAD), and Clock (SGPIO_CLOCK). In general, a signal line may include a conductor such as copper wire, an optical fiber, or any physical communication channel operable to transmit information. As shown, each of the FPGAs includes a D-type flip flop and various logic gates that are used to implement the functionality described herein. (The ENB signal shown is an ENABLE input to the tri-state buffer. Disabling the buffer may avoid output driver contention, which can occur when more than one driver is active at any given time.)

At stage 1, FPGA 215-2 powers up and its UART TX begins to transmit a broadcast message to FPGA 215-1 over the DataOut line. The broadcast message generally includes information about the system in which FPGA 215-2 resides, any vendor-specific parameters, versions, etc. The broadcast message is received by the UART RX at FPGA 215-1 at stage 2, which validates it against a set of expected results to determine the specifics of the SGPIO interface being established.

If the data results in a version match at stage 3, then FPGA 215-1 may disable its UART RX function and begin the SGPIO process at stage 4.

FPGA 215-2 may then detect a signal on the SGPIO_CLOCK line. At stage 5, FPGA 215-2 may release its SGPIO target interface from reset and place the UART TX into reset, disabling the UART functionality.

At this point in the process, the SGPIO interface has been established, and the UART interface has been disabled. Normal communications may proceed via the SGPIO interface, and the startup process may restart as needed any time either of the FPGAs are power-cycled.

The embodiment of FIG. 2 thus illustrates a situation in which no direct acknowledgment (ACK) signal is used. FIG. 3 illustrates a similar embodiment, but in which a direct ACK signal is used.

As in FIG. 2, when FPGA 315-2 is powered on, its UART TX begins transmitting a repeated SGPIO version payload to FPGA 315-1 at stage 1. Upon receiving the payload, FPGA 315-1 validates the contents against a set of expected results at stage 2. If the data matches, then FPGA 315-1 starts the SGPIO_CLOCK at stage 3. The clock signal is validated by the SGPIO TARGET INTERFACE of FPGA 315-2 at stage 4, and once it is stable, the UART TX changes the repeated payload being transmitted to an ACK payload at stage 5.

Once FPGA 315-1 validates the ACK payload at stage 6, the SGPIO HOST INTERFACE starts operating. The SGPIO HOST INTERFACE takes control of the SGPIO_DO line at stage 7 and starts to transmit SGPIO data. Upon detecting the clock pulses on the SGPIO_CLK line, the SGPIO TARGET INTERFACE of FPGA 315-2 disables the UART TX means of transmission at stage 8.

At this point in the process, the SGPIO interface has been established, and the UART interface has been disabled. Normal communications may proceed via the SGPIO interface, and the startup process may restart as needed any time either of the FPGAs are power-cycled.

The embodiments of FIGS. 2-3 use only a single signal line (SGPIO_DO) for establishing SGPIO communications via an initial UART communication session. However, in other embodiments, full-duplex UART communication may be used (e.g., using both the SGPIO_DO and SGPIO DI lines).

Further, while in some embodiments the UART broadcast may include only the SGPIO version payload, many other possibilities will be apparent to one of ordinary skill in the art with the benefit of this disclosure. For example, the broadcast messages may be used to negotiate other link parameters such as bitrate, mode settings, etc. In some embodiments, the UART broadcast messages may be used to select a different protocol altogether (e.g., low voltage differential signaling (LVDS) tunneling protocol & interface (LTPI) instead of SGPIO, etc.).

Additionally, the embodiments of FIGS. 2-3 contemplate a scenario in which the initiator device is already active when the target device starts up and begins transmitting its broadcast message. For such situations, the target may be configured to wake, announce its presence via repeated UART payloads, and then switch to SGPIO target mode once a signal is received on SGPIO_CLK (e.g., once two clock pulses are detected within a given time window such as 1 millisecond).

Meanwhile, the initiator may be configured to wait while listening for the UART payload from the target. Once it receives a payload, it starts sending clock pulses via SGPIO_CLK and switches to SGPIO initiator mode. The initiator may also be configured to verify the parity information of the incoming UART payloads, and if repeated (e.g., 10) payloads arrive with bad parity, then it may notify the host or management controller of a problem.

However, in other situations, the target device may already be active when the initiator device starts or restarts. Thus the initiator may be configured to announce its own presence to the target (e.g., via a different signal such as 10 clock pulses on SGPIO_CLK within 1 millisecond). The target may respond by sending its UART payload, and the process may proceed as described above.

Embodiments may thus provide many advantages. For example, embodiments provide for safe, two-phase, intra-FPGA discovery of flexible I/O and bus/interface characteristics. Embodiments provide for combining UART and SGPIO modes of operation on a single bus interface. Embodiments may utilize a single SGPIO conductor as a half-duplex UART signal for initial discovery of capabilities or two SGPIO conductors for full-duplex UART operation.

These techniques enable dynamic capability detection and negotiation while in UART mode so that the SGPIO data content can be adapted to different target types, different payload versions, etc. Embodiments may provide a notification to the host processor or management controller of compatibility check status, so that a user may be notified and may provide remediation instructions in situations where the FPGAs cannot adapt or reconcile themselves.

Embodiments may also provide for on-demand mode switching to dynamically change the SGPIO payload content definitions during runtime. For example, if an excessive number of bit errors are being observer, the SGPIO clock may be slowed down.

On-demand mode switching may be triggered in a variety of ways. For example, while the SGPIO_CLOCK or SGPIO_LOAD signals are "parked" or high-impedance, the target may pull a signal low momentarily to signal an interrupt to the initiator. This interrupt may be indicative of a request that the initiator begin a new data exchange to fetch new data.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:

at least one processor;

an interface configured to communicatively couple the at least one processor to an information handling resource via a first communications protocol; and an interface controller configured to manage the interface;

wherein the interface controller is configured to:

transmit a payload to the information handling resource via one or more signal lines of the interface, wherein the payload is transmitted via a second communications protocol different from the first communications protocol, and wherein the payload includes information usable to establish communications via the first communications protocol, the information including a version number associated with the first communications protocol, a bit rate associated with the first communications protocol, and one or more mode settings associated with the first communications protocol; and in response to the payload being received by the information handling resource, establish communications via the first communications protocol with the information handling resource over the one or more signal lines of the interface.

2. The information handling system of claim 1, wherein the first communications protocol is serial general purpose input/output (SGPIO).

3. The information handling system of claim 1, wherein the second communications protocol is universal asynchronous receiver/transmitter (UART).

4. The information handling system of claim 1, wherein the interface controller comprises a field-programmable gate array (FPGA).

5. The information handling system of claim 1, wherein the information handling system is a baseboard management controller (BMC).

6. The information handling system of claim 1, wherein the interface includes a plurality of signal lines, and wherein only a single one of the plurality of signal lines is used to transmit the payload.

7. A method comprising:

transmitting, by an interface controller of an interface that is configured to communicatively couple to an information handling resource via a first communications protocol, a payload from an information handling system to the information handling resource via one or more signal lines of the interface and via a second communications protocol different from the first communications protocol, wherein the payload includes information usable to establish communications via the first communications protocol, the information including a version number associated with the first communications protocol, a bit rate associated with the first communications protocol, and one or more mode settings associated with the first communications protocol; and in response to the payload being received by the information handling resource, the interface controller establishing communications via the first communications protocol with the information handling resource over the one or more signal lines of the interface.

8. The method of claim 7, wherein the first communications protocol is serial general purpose input/output (SGPIO).

9. The method of claim 7, wherein the second communications protocol is universal asynchronous receiver/transmitter (UART).

10. The method of claim 7, wherein the interface controller comprises a field-programmable gate array (FPGA).

11. The method of claim 7, wherein the information handling system is a baseboard management controller (BMC).

12. The method of claim 7, wherein the interface includes a plurality of signal lines, and wherein only a single one of the plurality of signal lines is used to transmit the payload.

13. An article of manufacture comprising a non-transitory, computer-readable medium having computer-executable instructions thereon that are executable by a processor of an interface controller of an interface that is configured to communicatively couple to an information handling resource via a first communications protocol for:

transmitting a payload from an information handling system to the information handling resource via one or more signal lines of the interface and via a second communications protocol different from the first communications protocol, wherein the payload includes information usable to establish communications via the first communications protocol, the information including a version number associated with the first communications protocol, a bit rate associated with the first communications protocol, and one or more mode settings associated with the first communications protocol; and in response to the payload being received by the information handling resource, the interface controller establishing communications via the first communications protocol with the information handling resource over the one or more signal lines of the interface.

14. The article of claim 13, wherein the first communications protocol is serial general purpose input/output (SGPIO).

15. The article of claim 13, wherein the second communications protocol is universal asynchronous receiver/transmitter (UART).

16. The article of claim 13, wherein the interface controller comprises a field-programmable gate array (FPGA).

17. The article of claim 13, wherein the information handling system is a baseboard management controller (BMC).

18. The article of claim 13, wherein the interface includes a plurality of signal lines, and wherein only a single one of the plurality of signal lines is used to transmit the payload.

* * * * *